(12) United States Patent
Pande et al.

(10) Patent No.: US 11,336,430 B2
(45) Date of Patent: May 17, 2022

(54) BLOCKCHAIN-INCORPORATING DISTRIBUTED AUTHENTICATION SYSTEM

(71) Applicant: SAP SE, Walldorf (DE)

(72) Inventors: Bhomik Pande, Lucknow (IN); Steven Garcia, South Riding, VA (US); Vaibhav Vohra, San Ramon, CA (US); Rohit Tripathi, San Ramon, CA (US); Fernando Nakano, Reston, VA (US)

(73) Assignee: SAP SE, Walldorf (DE)

( * ) Notice: Subject to any disclaimer, the term of this patent is extended or adjusted under 35 U.S.C. 154(b) by 116 days.

(21) Appl. No.: 16/124,732

(22) Filed: Sep. 7, 2018

(65) Prior Publication Data
US 2020/0084018 A1   Mar. 12, 2020

(51) Int. Cl.
| | | |
|---|---|---|
| *H04L 9/06* | (2006.01) | |
| *H04L 29/06* | (2006.01) | |
| *H04L 9/08* | (2006.01) | |
| *H04L 9/30* | (2006.01) | |
| *H04L 9/32* | (2006.01) | |

(52) U.S. Cl.
CPC ............ *H04L 9/0637* (2013.01); *H04L 9/085* (2013.01); *H04L 9/0844* (2013.01); *H04L 9/3066* (2013.01); *H04L 9/3228* (2013.01); *H04L 63/0838* (2013.01)

(58) Field of Classification Search
CPC ..... H04L 9/0637; H04L 9/0844; H04L 9/085; H04L 9/3066; H04L 9/3228; H04L 63/0838
See application file for complete search history.

(56) References Cited

U.S. PATENT DOCUMENTS

| | | |
|---|---|---|
| 9,824,031 B1 | 11/2017 | Ganti et al. |
| 9,875,510 B1 | 1/2018 | Kasper |
| 9,935,772 B1 | 4/2018 | Madisetti et al. |
| 10,050,955 B2 * | 8/2018 | Zollinger .............. H04L 63/061 |
| 10,868,673 B2 | 12/2020 | Mahanta et al. |
| 2015/0363782 A1 | 12/2015 | Ronca et al. |
| 2016/0127902 A1 * | 5/2016 | Ciarniello ......... H04W 12/0608 380/247 |
| 2016/0224949 A1 | 8/2016 | Thomas et al. |
| 2016/0261685 A1 | 9/2016 | Chen et al. |

(Continued)

OTHER PUBLICATIONS

US 10,693,653 B2, 06/2020, Mahanta et al. (withdrawn)

(Continued)

*Primary Examiner* — Michael R Vaughan
*Assistant Examiner* — Vladimir I Gavrilenko
(74) *Attorney, Agent, or Firm* — Schwegman Lundberg & Woessner, P.A.

(57) ABSTRACT

Disclosed herein are system, method, and device embodiments for an authentication workflow incorporating blockchain technology. An embodiment operates by requesting, from a distributed authentication service, transmission of a time-based one-time password to a communication endpoint associated with an end-user, receiving a time-based one-time password submission from a user device associated with the end-user, retrieving a plurality of distributed ledger entries (e.g., a plurality of blocks of a blockchain), and validating the time-based one-time password submission based on the plurality of distributed ledger entries as a part of a two factor authentication workflow.

16 Claims, 7 Drawing Sheets

(56) References Cited

U.S. PATENT DOCUMENTS

| | | |
|---|---|---|
| 2017/0091397 A1 | 3/2017 | Shah |
| 2017/0140408 A1 | 5/2017 | Wuehler |
| 2017/0214699 A1 | 7/2017 | Johnsrud |
| 2017/0228734 A1 | 8/2017 | Kurian |
| 2017/0236120 A1 | 8/2017 | Herlihy et al. |
| 2017/0237554 A1 | 8/2017 | Jacobs et al. |
| 2017/0244707 A1 | 8/2017 | Johnsrud et al. |
| 2017/0270527 A1 | 9/2017 | Rampton |
| 2017/0279818 A1 | 9/2017 | Milazzo et al. |
| 2017/0287593 A1 | 10/2017 | Ovalle |
| 2017/0289134 A1 | 10/2017 | Bradley et al. |
| 2017/0300627 A1 | 10/2017 | Giordano et al. |
| 2017/0317997 A1 | 11/2017 | Smith et al. |
| 2017/0323392 A1 | 11/2017 | Kasper et al. |
| 2018/0075527 A1 | 3/2018 | Nagla et al. |
| 2018/0096752 A1 | 4/2018 | Ovalle |
| 2018/0101560 A1 | 4/2018 | Christidis et al. |
| 2018/0114403 A1 | 4/2018 | Jayachandran |
| 2018/0121909 A1 | 5/2018 | Christidis et al. |
| 2018/0189732 A1 | 7/2018 | Kozloski et al. |
| 2018/0212970 A1 | 7/2018 | Chen et al. |
| 2018/0248880 A1 | 8/2018 | Sardesai et al. |
| 2018/0302215 A1 | 10/2018 | Salgueiro et al. |
| 2018/0308134 A1 | 10/2018 | Manning et al. |
| 2018/0337769 A1 | 11/2018 | Gleichauf |
| 2018/0337771 A1 | 11/2018 | Baker et al. |
| 2018/0341930 A1 | 11/2018 | Moir et al. |
| 2019/0020661 A1 | 1/2019 | Zhang |
| 2019/0034612 A1* | 1/2019 | Smales .................. H04W 12/00 |
| 2019/0034892 A1 | 1/2019 | Smith et al. |
| 2019/0036702 A1 | 1/2019 | Kano et al. |
| 2019/0036914 A1* | 1/2019 | Tzur-David ............. H04L 63/10 |
| 2019/0050431 A1 | 2/2019 | Callan et al. |
| 2019/0068562 A1* | 2/2019 | Iyer ........................ H04L 9/3213 |
| 2019/0087893 A1 | 3/2019 | Pellew |
| 2019/0097807 A1 | 3/2019 | Mahanta et al. |
| 2019/0122186 A1 | 4/2019 | Kano et al. |
| 2020/0058021 A1* | 2/2020 | Mittal .................. G06Q 20/385 |
| 2020/0067697 A1* | 2/2020 | Puddu .................. G06F 21/602 |

OTHER PUBLICATIONS

"U.S. Appl. No. 15/714,041, Examiner Interview Summary dated Jan. 7, 2020", 3 pgs.

"U.S. Appl. No. 15/714,041, Final Office Action dated Oct. 2, 2019", 13 pgs.

"U.S. Appl. No. 15/714,041, Non Final Office Action dated May 28, 2019", 16 pgs.

"U.S. Appl. No. 15/714,041, Notice of Allowance dated Feb. 21, 2020", 9 pgs.

"U.S. Appl. No. 15/714,041, Response filed Jan. 2, 2020 to Final Office Action dated Oct. 2, 2019", 13 pgs.

"U.S. Appl. No. 15/714,041, Response filed Aug. 19, 2019 to Non-Final Office Action dated May 28, 2019", 14 pgs.

"U.S. Appl. No. 15/714,041, Notice of Allowance dated Sep. 16, 2020", 7 pgs.

Maesa, Damiano Di Francesco, et al., "Blockchain based access control", IFIP International Conference on Distributed Applications and Interoperable Systems. Springer, Cham, (2017).

Poon, Joseph, et al., "Plasma: Scalable Autonomous Smart Contracts", White paper, (2017), 1-47.

Xu, Lei, et al., "DI-bac: Distributed ledger-based access control for web applications", Proceedings of the 26th International Conference on World Wide Web Companion, (2017).

Jansen, M., "About a Decentralized 2FA Mechanism," ICIW 2017: The Twelfth International Conference on Internet and Web Applications and Services, 2017, pp. 44-47.

"U.S. Appl. No. 15/714,041, Corrected Notice of Allowability dated Nov. 5, 2020", 5 pgs.

U.S. Appl. No. 15/714,041, filed Sep. 25, 2017, Network Access Control Based on Distributed Ledger.

* cited by examiner

BLOCKCHAIN-INCORPORATING DISTRIBUTED AUTHENTICATION SYSTEM

BACKGROUND

Typically, digital networks implement centralized trust systems reliant on centralized authorities to determine trust values of actors within the network. In some examples, a centralized authority may be responsible for authenticating users within the network and/or authorizing actions by user devices within the network. Generally, centralized trust systems pose many risks given that a centralized authority may be a single point of failure. In addition, communications with centralized trust authorities may be susceptible to a variety of attacks (e.g., man in the middle attacks). Further, the weaknesses of centralized trust paradigms are not fully addressed by security methods traditionally thought to be secure, such as multi-factor authentication.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for utilizing blockchain technology to implement an authentication workflow in a distributed authentication system.

Figure 1:
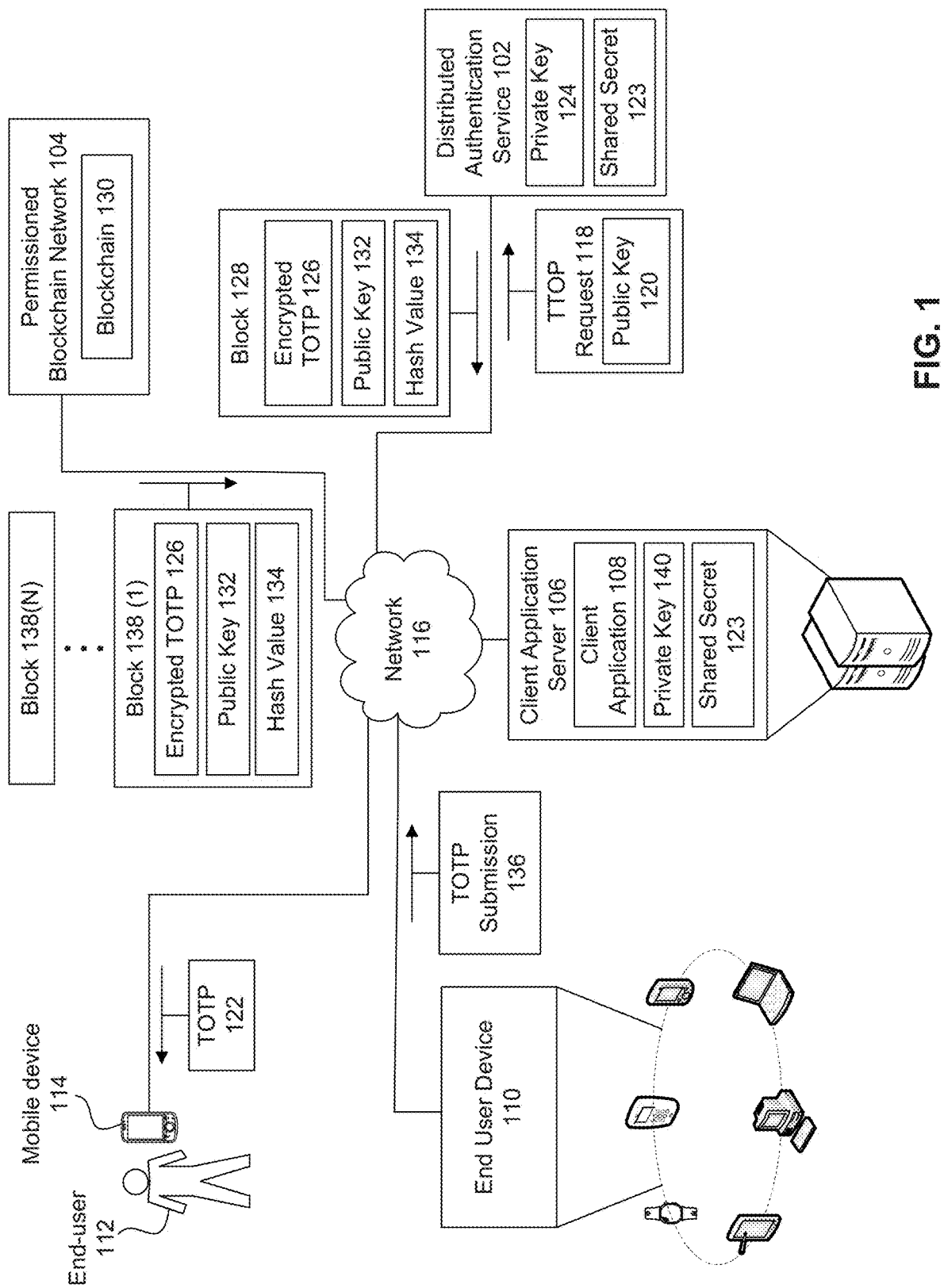
FIG. 1 is a block diagram of an example framework for utilizing blockchain technology to implement an authentication workflow in a distributed authentication system, according to some embodiments.

FIG. 1 illustrates a block diagram of an example framework for utilizing blockchain technology to implement an authentication workflow in a distributed authentication system 100, according to some embodiments. As illustrated in FIG. 1, the distributed authentication system 100 includes a distributed authentication service (DAS) 102, a permissioned blockchain network (PBN) 104, a client application server 106 including an client application 108, an end user device 110 associated with an end-user 112, and a mobile device 114 associated with the end-user 112.

Additionally, the DAS 102, the PBN 104, the client application server 106, the end user device 110, and the mobile device 114 may communicate via a communication network(s) 116. The communication network(s) 116 may include any combination of a private network, personal area network (PAN), Local-Area Network (LAN), Wide-Area Network (WAN), or the Internet. Further, the connection between the DAS 102, the PBN 104, the client application server 106, the end user device 110, and the mobile device 114, and the communication network(s) 116 may be a wireless connection (e.g., Bluetooth, Wi-Fi connection, etc.), or a wired connection (e.g., Ethernet, universal serial bus (USB), etc.), or a combination thereof.

The DAS 102 may be a remote service that provides authentication services to the client application 108. In some embodiments, the DAS 102 may provide complementary authentication functionalities to the client application 108. For instance, the client application 108 may perform a password authentication method, and the DAS 102 may be configured to provide additional authentication methods in a multifactor authentication system (e.g., two factor authentication).

The PBN 104 may be a decentralized network that employs a shared distributed ledger that records an immutable history of transactions involving participants in the PBN 104. In some embodiments, the PBN 104 may be a private blockchain network. As such, participants (i.e., network partners) within the PBN 104 may need to obtain an invitation or permission to join the PBN 104. In some embodiments, participants in the network may be required to meet certain criteria with respect to trust, processing capacity, and/or data network speed. In some other embodiments, the distributed authentication system may employ a permissionless blockchain or hybrid blockchain.

The client application 108 may be an application that relies on the DAS 102 for authenticating its users (e.g., end-user 112) and user devices (e.g., end-user device 110). For example, the client application 108 may use an application programming interface (API) provided by the DAS 102 to authenticate users of the client application 108. Although FIG. 1 illustrates that the client application server 106 includes the client application 108, in some embodiments, functions of the client application 108 may be performed by one or more related applications executed by the end-user device 110. Some examples of an end-user device include smart phones and mobile communication devices; tablet computing devices; wearable computing devices; desktops, laptops, netbooks and other portable computers and any other device capable of communicating with the client application 108. In addition, some examples of a mobile device include smart phones and mobile communication devices; tablet computing devices; wearable computing devices; laptops, netbooks and other portable computers.

In some embodiments, the end-user 112 may attempt to perform a client application action that requires authorization. As a result, the client application 108 may perform two factor authentication of the end-user 112 to determine the identity of the end-user 112 in order to determine whether the end-user 112 is authorized to perform the client application action.

In the first step of the two factor authentication, the end-user device 110 may send authentication credentials to the client application 108. Further, the client application 108 may use locally stored information to verify the authentication credentials. Additionally, or alternatively, the client application 108 may employ the DAS 102 to verify the authentication credentials. In some embodiments, the authentication credentials may include at least one of username, password, secret, credential, time-varying passcode, digital certificate, etc.

In the second step of the two factor authentication, the client application 108 may send the DAS 102 a TOTP request 118 instructing the DAS 102 to transmit a time-based one time password (TOTP) to a communication endpoint associated with the end-user 112. In some embodiments, the communication endpoint may include an email address associated with the end-user 112, or a short message service (SMS) telephone number associated with the mobile device 114. Further, the TOTP request 118 may include a public key 120 of the client application 108. In some other embodiments, the DAS 102 may employ other types of one-time passwords (e.g., HMAC-based one-time password) or other forms of credentials.

In response to the TOTP request 118, the DAS 102 may transmit a TOTP 122 to the mobile device 114 as the second challenge in a two-factor authentication workflow. Further, the DAS 102 may generate a shared secret key 123 using the public key 120 of the client application 108 and a private key 124 of the DAS 102. Once the shared secret key is generated, the DAS 102 may generate an encrypted TOTP 126 using the shared secret key 123.

In some embodiments, the DAS 102 may use elliptic curve Diffie-Hellman (ECDH) crypto system to determine the shared secret key 123. ECDH is a key exchange algorithm that is based on Elliptic Curve Cryptography (ECC) for public/private key generation. ECC is an approach to public-key cryptography based on an algebraic structure of elliptic curves over finite fields. An elliptic curve is a plane curve defined by an equation of the form $y2=x3+ax+b$. The set of points on such a curve can be shown to form a commutative group G, such that $a*b=b*a$ for all a and b in G. ECDH allows the two entities to establish a shared secret key over an insecure channel. The shared secret key can then be used to encrypt subsequent communications using a symmetric key cipher.

For instance, in some embodiments, the DAS 102 may use a symmetric key encryption technique to encrypt the TOTP 122. Some examples of symmetric key encryption techniques include Blowfish, Data Encryption Standard (DES), Advanced Encryption Standard (AES), Tiny Encryption Algorithm (TEA), International Data Encryption Algorithm, IDEA, MARS, RC5, RC6, Rinjndael, Serpent, Triple-DES, Twofish, etc.

Further, the DAS 102 may generate a block 128 to be added to a blockchain 130 of the PBN 104. The block 128 may include the public key 132 of the DAS 102, the encrypted TOTP 126, and a hash value 134 corresponding to a state of the blockchain 130 prior to addition of the block 128. Further, the DAS 102 may replicate the block 128 to instances of the blockchain 130 maintained within the PBN 104.

In some embodiments, the end-user 112 may use the end-user device 110 to send a TOTP submission 136 to the client application 108. Upon receipt of the TOTP submission 136, the client application 108 may request a plurality of blocks 138(1)-(N) corresponding to the block 128 from the PBN 104. Upon receipt of the plurality of blocks 138(1)-(N), the client application 108 may perform a consensus algorithm to identify the encrypted TOTP 126 and/or the public key 132 of the DAS 102. A "consensus algorithm" as referred to herein is a process used to achieve agreement on one or more data values among distributed processes or systems. In some examples, consensus algorithms may be designed to achieve reliability in a network involving multiple source nodes. Some examples of consensus algorithms include proof of work algorithms, proof of stake algorithms, practical byzantine fault tolerance (PBFT), deposit based consensus algorithms, federated byzantine agreement (FBA), etc. In some embodiments, a consensus algorithm may be used for validating authentication transactions within the distributed authentication system 100 and/or validating new blocks within the distributed authentication system.

Once the encrypted TOTP 126 is identified, the client application 108 may form the shared secret key 123 using a private key 140 of the client application 108 and the public key 132 of the DAS 102 included in the plurality of blocks 138(1)-(N). Further, the client application 108 may decrypt the encrypted TOTP 126 to obtain the TOTP 122, and compare the obtained TOTP 122 to the TOTP submission 136. If the TOTP submission 136 matches the obtained TOTP 122, the end-user 112 may be authorized to perform the client application action. If the TOTP submission 136 does not match the obtained TOTP 122, the end-user 112 may be denied permission to perform the client application action.

By employing the PBN 104 as the source of a trust, the distributed authentication system 100 provides greater security to critical authentication functions by reducing the reliance of the distributed authentication system 100 on a single a centralized server. For instance, the security of a SMS-based two-factor authentication may be significantly improved as the blockchain 130 of the PBN 104 reduces the susceptibility of the distributed authentication system 100 to common attacks, such as man in the middle attacks. Further, the blockchain 130 provides additional security by storing the hashes of the secrets within distributed authentication system 100 instead of the secrets themselves, thereby limiting the negative consequences in the event the distributed authentication system 100 is compromised.

Figure 2:
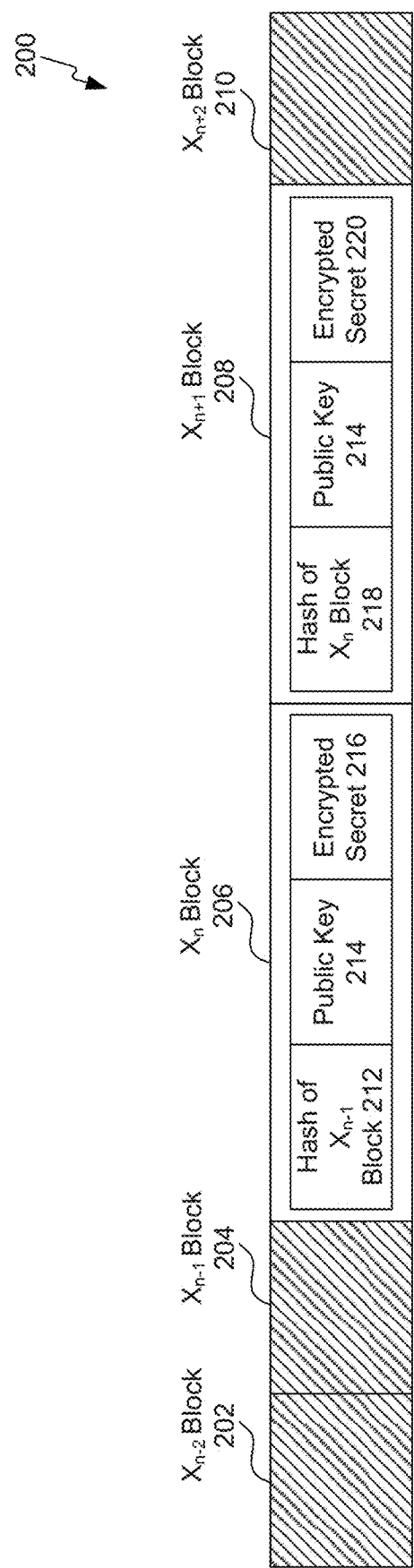
FIG. 2 is a block diagram of an example blockchain for use in an authentication workflow in a distributed authentication system, according to some embodiments.

FIG. 2 illustrates a block diagram of an example blockchain for use in an authentication workflow in a distributed authentication system, according to some embodiments. As illustrated in FIG. 2, the blockchain 200 may include blocks 202, 204, 206, 208, 210. Further, the block 206 may include a hash 212 of the block 204, a public key 214 of a DAS (e.g., the DAS 102) that generated the block 206, and a first TOTP 216 (e.g., TOTP 122) encrypted by a shared secret key (e.g., the shared secret key 123). As described in detail herein, the shared secret key may be derived from the combination of a public key of a client application and a private key of a DAS, or the private key of a client application and the public key of the DAS.

As further illustrated in FIG. 2, the block 208 may include a hash 218 of the block 206, a public key 214 of the DAS that generated the block 208, and a second TOTP 220 encrypted by the shared secret key.

Figure 3:
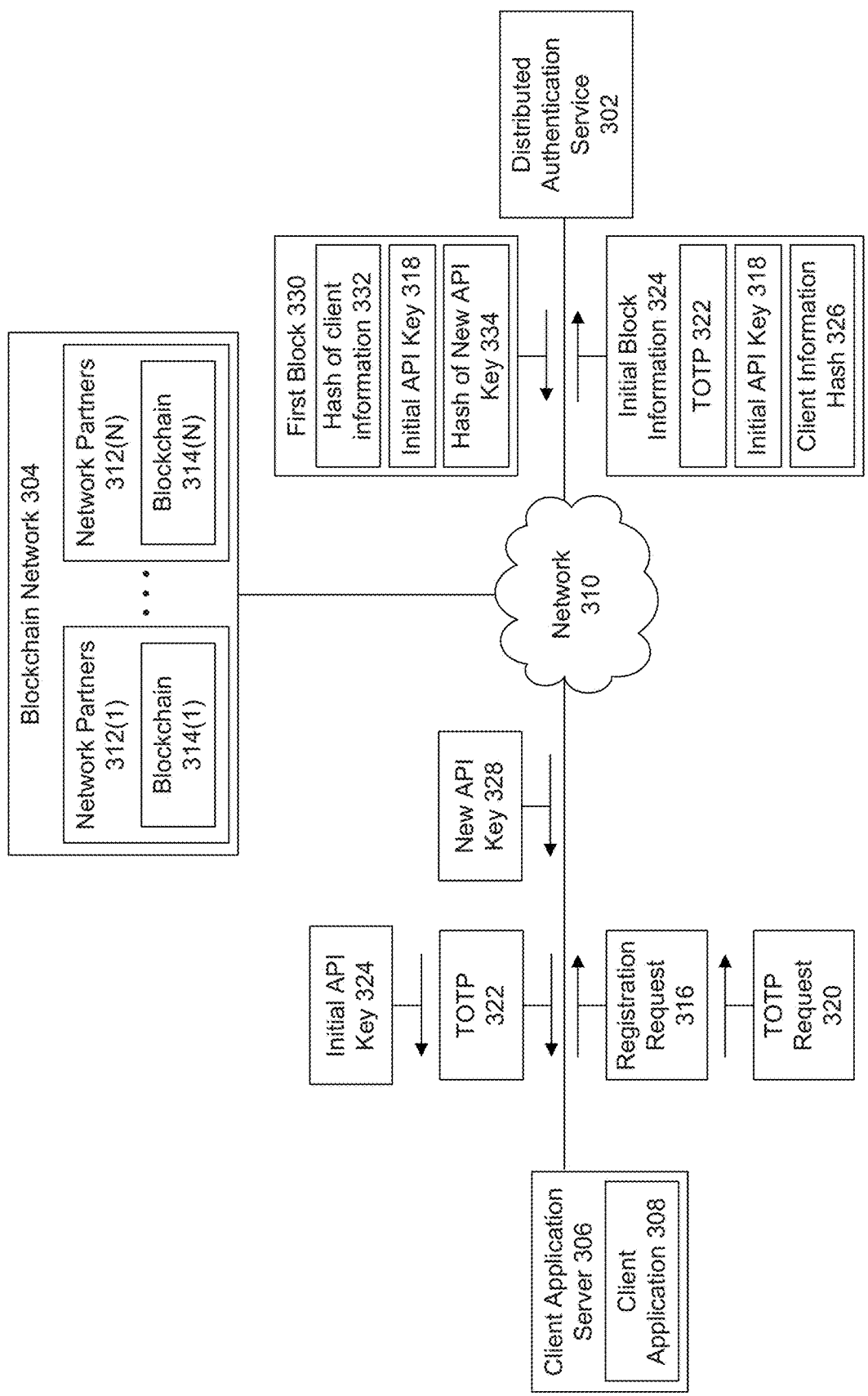
FIG. 3 is a block diagram of an example framework for generating a genesis block, according to some embodiments.

FIG. 3 illustrates a block diagram of an example framework for generating a genesis block in a distributed authentication system 300, according to some embodiments. As illustrated in FIG. 3, the distributed authentication system 300 includes a distributed authentication service 302, a blockchain network 304, and a client application server 306 including a client application 308. Some examples of the blockchain network include permissionless blockchains, permissioned blockchains (consortium blockchains), or any combination thereof, including hybrid blockchains.

Additionally, the distributed authentication service (DAS) 302, the blockchain network 304, and the client application server 306, may communicate via a communication network(s) 310. The communication network(s) 310 may include any or all of a private network, personal area network (PAN), Local-Area Network (LAN), Wide-Area Network (WAN), or the Internet. Further, the connection between the DAS 302, blockchain network 304, and the client application server 306, and the communication network(s) 310 may be a wireless connection (e.g., Bluetooth, Wi-Fi connection, etc.), or a wired connection (e.g., Ethernet, universal serial bus (USB), etc.), or a combination thereof.

In some embodiments, a plurality of network partners 312(1)-(N) of the blockchain network 304 may store a plurality of instances of a blockchain 314 corresponding to the client application 306. For instance, a first network partner 312(1) may store a first instance of the blockchain 314, an Nth network partner 312(N) may store an Nth instance of the blockchain 314, and so forth. Although FIG. 1 illustrates that the network partners 312(1)-(N) only store one instance of a blockchain 314, the network partners 312(1)-(N) may store instances of blockchains for numerous other client applications as a participant in the blockchain network 304. In some embodiments, a network partner 312 may store an instance of the blockchain 314 in a database. Further, in some instances, the DAS 302 and/or the client application 308 may be network partners As used herein, the term "database" refers to an organized collection of data. In some embodiments, a database may include a plurality of data tables comprising data values (e.g., alphanumeric strings, integers, decimals, floating points, dates, times, binary values, Boolean values, and/or enumerations). Some examples of databases include columnar databases, relational databases, key-store databases, graph databases, and document stores.

Further, the blockchain 314 may be initialized by the DAS 302. For example, the client application 308 may send a registration request 316 to the DAS 302. In addition, the client application 308 may create an application identifier (e.g., an application name) and generate an initial API key 318. In some embodiments, the client application 308 may employ an API of the DAS 302 to create the application identifier and generate the initial API key 318.

As illustrated in FIG. 2, the client application 308 may also transmit a TOTP request 320 including the API key 318 to the DAS 302. In response, the DAS 302 may send a TOTP 322 to the client application 308. Once the client application 308 receives the TOTP 322, the client application 308 may generate initial block information 324 and send the initial block information 324 to the DAS 302. In some embodiments, initial block information 324 may include the TOTP 322, the initial API key 318, and a hash 326 of client information corresponding to the client application 308.

Upon receipt of the initial block information 324, the DAS 302 may generate a new API key 328 and a first block 330 (i.e., the genesis block) of the blockchain 314 corresponding to the client application 308. In some embodiments, the first block 330 includes the hash 326 of the client information, a null value for a previous hash field, a hash 332 of the initial API key 318 for the current hash field, a hash 334 of the new API key 328 for the address field. Further, the DAS 302 may replicate the blockchain 314 including the first block 330 within the blockchain network 304. In addition, the DAS 302 may send the new API key 328 to the client application 308. As described herein, the new API key 328 may be used for subsequent authentication of end-users (e.g., the end user) of the client application 308. For instance, the new API key 328 may be used in a TOTP request (e.g., the TOTP request 118).

Figure 4:
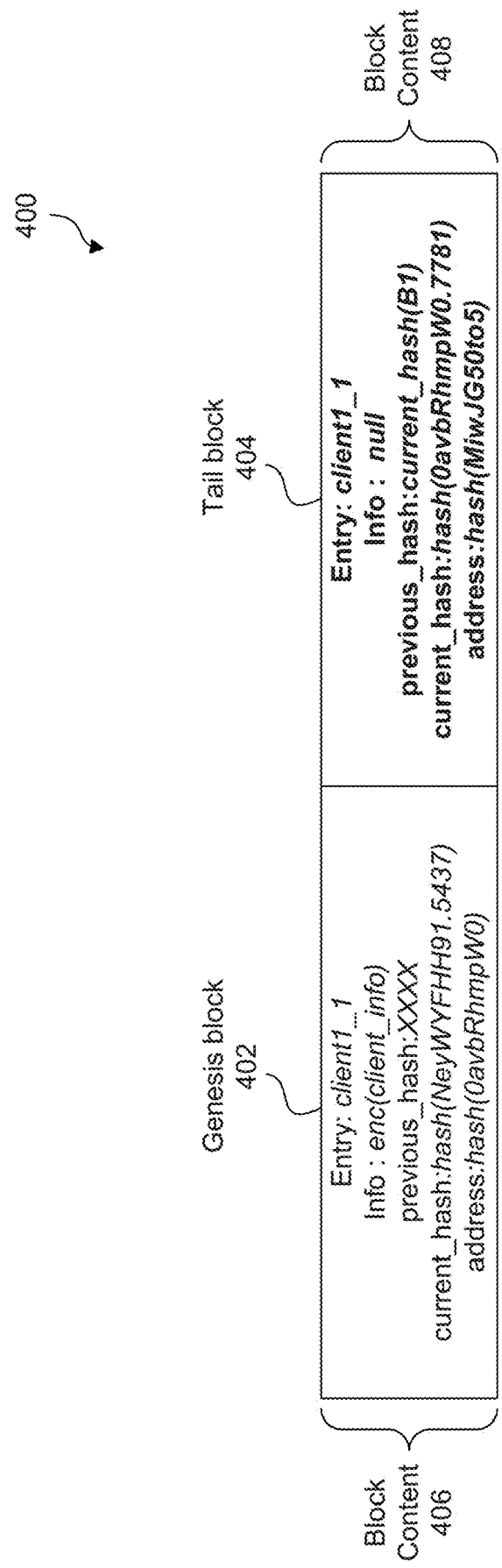
FIG. 4 is a block diagram of an example blockchain for use in an authentication workflow in a distributed authentication system, according to some embodiments.

FIG. 4 illustrates a block diagram of an example blockchain for use in an authentication workflow in a distributed authentication system, according to some embodiments. As illustrated in FIG. 4, the blockchain 400 may include blocks 402 (i.e., the genesis block of the blockchain 400) and 404. As illustrated in FIG. 4, the block 402 may include block content 406 comprising encrypted client information in an information field, a hash of a first API key (e.g., initial API key 318) in a current hash field, and a hash of a second API key (e.g., new API key 328) in an address field. As further illustrated in FIG. 4, the block 404 may include block content 408 comprising a hash of block 402 in a previous hash field, a hash of the second API key in a current hash field, and a hash of a third API key in an address field.

In some embodiments, the blockchain 400 may be used to validate a TOTP by verifying fields of the blocks 402 and 404 of the blockchain 400. For example, a client application (e.g., client applications 108 and 308) or DAS (e.g., DAS 102 and 302) may verify that the information field of the block 402 matches an expected value corresponding to a hash of the client information and a one-time secret. As another example, a client application or DAS may verify that the address field of the tail block 404 (i.e., the last block of the blockchain 400) matches the hash of the current API key of the client application.

Figure 5:
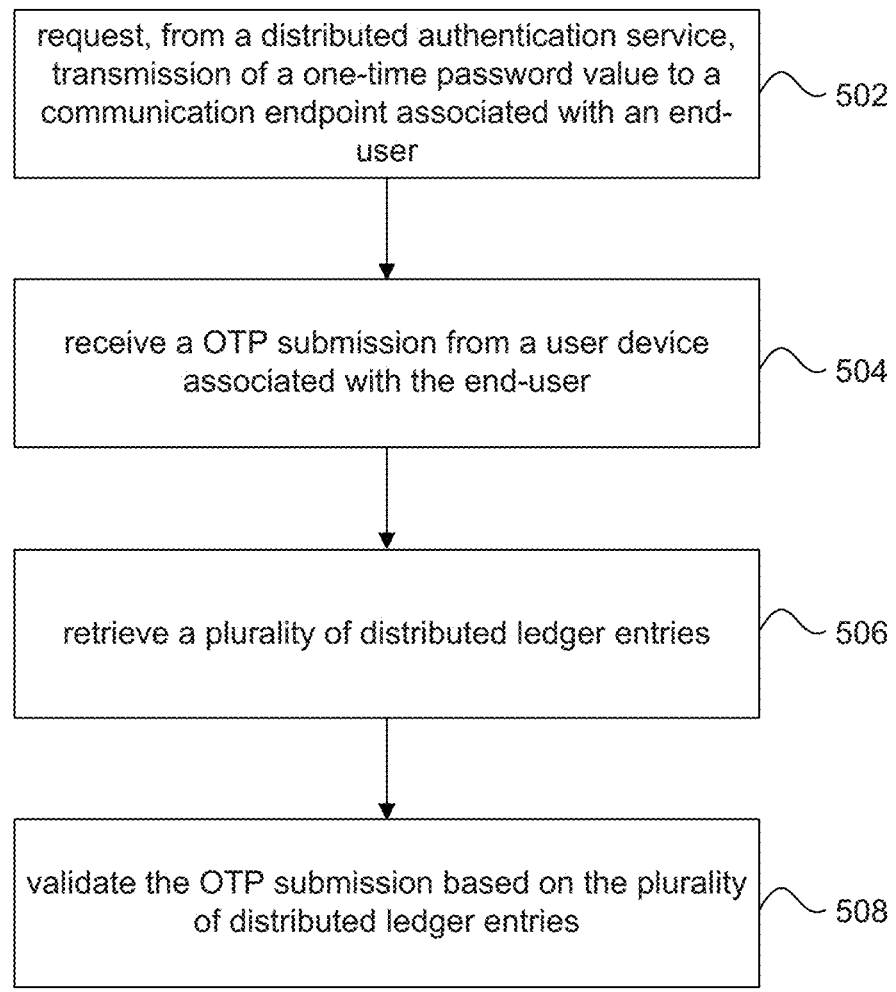
FIG. 5 is a flowchart illustrating a process for validating a one-time password in a distributed authentication system employing a blockchain, according to some embodiments.

FIG. 5 is a flowchart for a method 500 for a process for validating a one-time password in a distributed authentication system employing a blockchain, according to an embodiment. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIGS. 1 and 3. However, method 500 is not limited to that example embodiment.

In 502, the client application may request, from a DAS, transmission of a one-time password (OTP) value to a communication endpoint associated with an end-user. For example, the client application 108 may send the TOTP request 118 to the DAS 102. In some embodiments, the TOTP request 118 may include an API key (e.g., 324) of the client application 108. Upon receipt of the TOTP request 118, the DAS 102 may generate the TOTP 122, and transmit the TOTP 122 to the mobile device 114. Additionally, in some embodiments, the DAS 102 may issue a new API key to the client application 108 after an authentication transaction within the distributed authentication system 100.

In 504, the client application may receive an OTP submission from a user device associated with the end-user. For example, the end-user device 108 may send a TOTP submission 136 to the client application 108.

In 506, the client application may retrieve a plurality of distributed ledger entries. For example, the client application 108 may request the last block 138 of a private blockchain 130 from a plurality of network partners (e.g., the network partner 312(1)-(N)) of the private blockchain network 104. Further, the network partners may send the plurality of blocks 138(1)-(N) to the client application 108.

In 508, the client application may validate the OTP submission based on the plurality of distributed ledger entries. For example, the client application 108 may identify the public key 132 associated with the DAS 102 within the plurality of blocks 138(1)-(N). Further, the client application 108 may determine a shared secret key 123 based on the public key 132 of the DAS 102 and a private key 140 of the client application 108. In some embodiments, the client application 108 may use a secret key exchange protocol to determine a shared secret key 123. For instance, the client application 108 may apply the ECDH key exchange protocol to generate the shared secret key 123. Once the client application 108 has determined the shared secret key 123, the client application 108 may decrypt an encrypted TOTP 126 associated with the plurality of blocks 138(1)-(N) to determine a reference TOTP. Further, the client application 108 may compare the reference TOTP to the TOTP submission 136 received from the end-user device 110. If the TOTP submission 136 matches the reference TOTP 122, the end-user 112 may be authorized to perform a requested action using the client application 108. If the TOTP submission 136 does not match the obtained TOTP 122, the end-user 112 may be denied permission to perform a requested action using the client application 108.

In some other embodiments, the encrypted TOTP 126 may be stored in a secure storage location associated with the client application or the DAS. Further, the location of the encrypted TOTP 126 within secure storage may be stored on the blockchain 130 instead of the encrypted TOTP 126. As such, the client application 108 may determine the location of the encrypted TOTP 126 based on applying a consensus algorithm to the plurality of blocks 138(1)-(N). Additionally, the client application 108 may retrieve the encrypted TOTP 126 from the location within secure storage.

Once the client application 108 has retrieved the encrypted TOTP 126 from the location within secure storage, the client application 108 may determine the shared secret key 123, and decrypt the encrypted TOTP 126 to determine a reference TOTP. Further, the client application 108 may compare the reference TOTP to the TOTP submission 136 received from the end-user device 110. If the TOTP submission 136 matches the reference TOTP 122, the end-user 112 may be authorized to perform a requested action using the client application 108. If the TOTP submission 136 does not match the obtained TOTP 122, the end-user 112 may be denied permission to perform a requested action using the client application 108.

Figure 6:
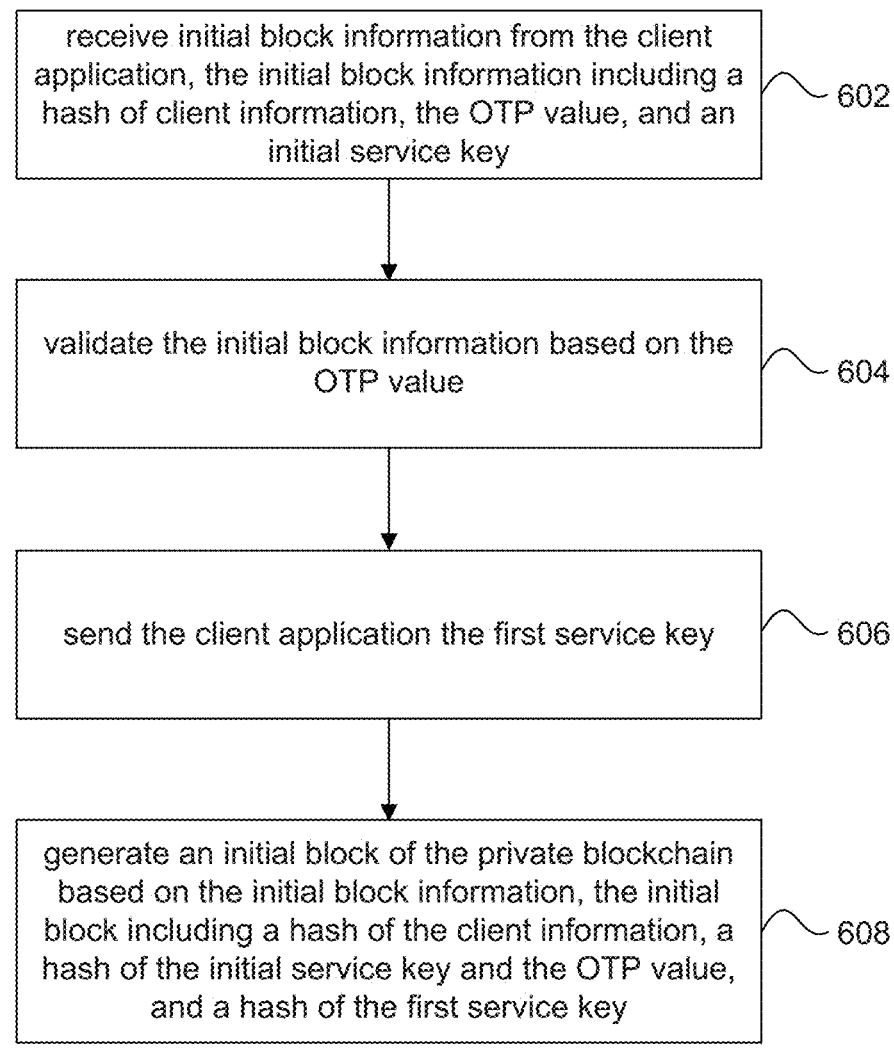
FIG. 6 is a flowchart illustrating a process for generating a genesis block in a distributed authentication system employing a blockchain, according to some embodiments.

FIG. 6 is a flowchart for a method 600 for generating a genesis block in a distributed authentication system employing a blockchain, according to an embodiment. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIGS. 3 and 4. However, method 600 is not limited to that example embodiment.

In 602, the DAS may receive initial block information from the client application, the initial block information including a hash of client information, the OTP value, and an initial service key. For example, the DAS 302 may receive the initial block information 324 from the client application 306. In some embodiments, initial block information 324 includes the TOTP 322, the initial API key 318, and a hash 326 of client information.

In 604, the DAS may validate the initial block information based on the OTP value. For example, the DAS 302 may compare the TOTP 322 of the initial block information 324 to a locally stored reference TOTP to verify client application 308 as the proper source of the initial block information 324.

In 604, the DAS may send the client application the first service key. For example, the DAS 302 may send the client application 308 the new API key 328.

In 604, the DAS may generate an initial block of the private blockchain based on the initial block information. The initial block may include the hash of client information, a hash of the initial service key and the OTP value, and a hash of the first service key. For example, the DAS 302 may generate the first block 330 or 502. As described herein, the first block 330 may include the hash 326 of the client information, a null value for a previous hash field, a hash 332 of the initial API key 318 for the current hash field, and a hash 334 of the new API key 328 for the address field. Once the first block 330 is generated, the DAS 302 may replicate the blockchain 314 including the first block 330 within the blockchain network 304.

Figure 7:
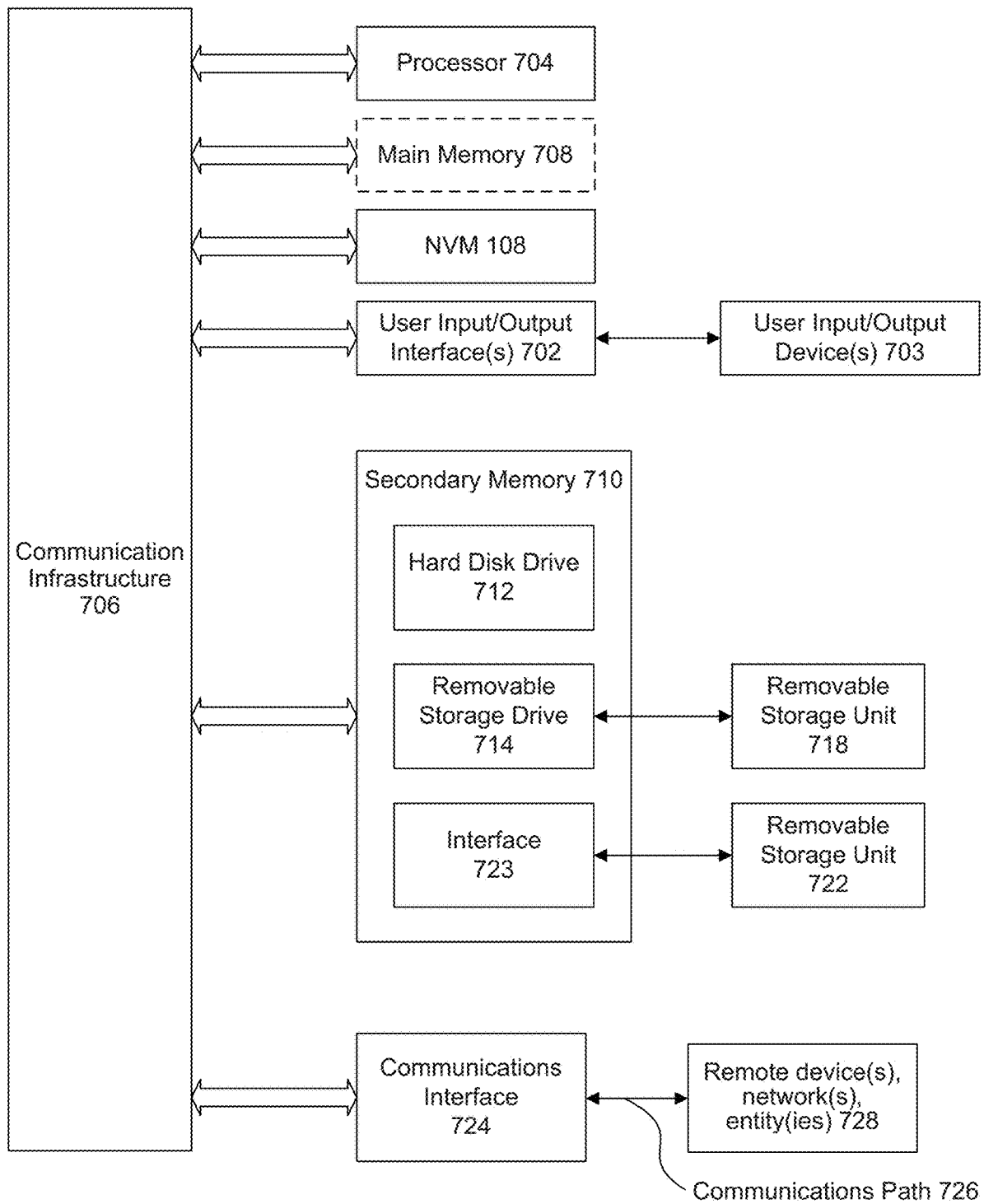
FIG. 7 is an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:
1. A method comprising:
employing an API provided by a remote service to generate an initial key;

sending a request to the remote service, the request requesting transmission of a one-time password (OTP) value from a communication endpoint, the request including the initial key;

receiving an OTP submission from the communication endpoint;

generating initial block information, the initial block information including the OTP submission and the initial key;

sending the initial block information to the remote service to generate a new key and a first block of a plurality of blocks of a blockchain, the first block including a hash of the initial key and a hash of the new key;

receiving the new key from the remote service;

retrieving at least a portion of the plurality of blocks from the remote service;

determining a reference OTP from the at least the portion of the plurality of blocks; and validating an additional OTP submission from the communication endpoint or an additional communication endpoint based on a matching of the additional OTP submission to the reference OTP.

2. The method of claim 1, further comprising: permitting or denying an additional request based on the validating.

3. The method of claim 2, wherein the initial key is an initial API key, the new key is a new API key, and the validating of the OTP submission comprises:

determining a public key within the plurality of blocks;

determining a shared secret key based on the public key and a private key; and determining the reference OTP based on decrypting of an encrypted reference OTP value using the shared secret key.

4. The method of claim 3, wherein the determining of the shared secret key comprises determining the shared secret key in accordance with an elliptic-curve Diffie-Hellman key exchange.

5. The method of claim 3, wherein the plurality blocks is a first plurality of distributed ledger entries, and further comprising verifying a distributed ledger entry of the first plurality of distributed ledger entries based on a hash value associated with a second plurality of ledger entries, the first plurality of ledger entries recorded after a second plurality of distributed ledger entries.

6. The method of claim 3, wherein the plurality of blocks is a first plurality of blocks corresponding to a tail of a private blockchain, and an individual block of the plurality of blocks includes the public key, the encrypted reference OTP, and a hash of a second plurality of blocks of the private blockchain recorded before the first plurality of blocks.

7. The method of claim 3, further comprising verifying contents of the plurality of blocks based on a consensus algorithm.

8. The method of claim 3, wherein the plurality of blocks corresponds to a private blockchain.

9. The method of claim 3, wherein the public key is associated with a distributed authentication service (DAS) and the private key is associated with a client application.

10. The method of claim 1, wherein the validating of the OTP submission comprises:

determining a location identifier based on the plurality of blocks;

determining a shared secret key based on a public key and a private key;

identifying an encrypted identifier stored in a secure storage location based on the location identifier; and determining the reference OTP based on a decrypting of an encrypted reference OTP value using the shared secret key.

11. The method of claim 1, wherein the OTP submission includes at least one of an e-mail address or a short messaging system number.

12. The method of claim 1, wherein:

the initial block information further includes client information; and the first block further includes the hash of the client information.

13. A device comprising:

one or more computer memories;

one or more processors and/or circuits coupled to the one or more computer memories and configured to, at least:

employ an API provided by a remote service to generate an initial key;

send a request to the remote service, the request requesting transmission of a time-based one-time password (TOTP) value from a communication endpoint, the request including the initial key;

receive a TOTP submission the communication endpoint;

generate initial block information, the initial block information including the TOTP submission and the initial key;

send the initial block information to the remote service to generate a new key and a first block of a plurality of blocks of a private blockchain, the first block including a hash of the initial key and a hash of the new key;

receive the new key from the remote service;

use the new key to retrieve at least a portion of the plurality of blocks of the private blockchain from a plurality of trusted participants, the at least the portion of the plurality of blocks including a last block of the private blockchain;

determine a consensus value based on the at least the portion of the plurality of blocks; and validate an additional TOTP submission from the communication endpoint or an additional communication endpoint based on a comparison of the additional TOTP submission with the consensus value.

14. The device of claim 13, wherein the consensus value includes an encrypted TOTP, and the one or more processors and/or circuits are further configured to:

determine a public key associated with the DAS based on the plurality of blocks;

determine a shared secret key based on the public key of the DAS and a private key of the client application;

determine a decrypted reference TOTP based on decrypting the encrypted reference TOTP using the shared secret key; and compare the decrypted reference TOTP value to the OTP submission.

15. The device of claim 13, wherein the consensus value includes a location identifier of an encrypted TOTP within secure storage, and the one or more processors and/or circuits are further configured to:

determine a shared secret key based on the public key and a private key of the client application;

identify the encrypted reference TOTP based on the location identifier;

determine a decrypted reference TOTP value based on decrypting of the encrypted reference TOTP value using the shared secret key; and compare the decrypted reference OTP value to the TOTP submission.

16. The device of claim 13, wherein the one or more processors and/or circuits are further configured to: authorize a user device to perform an action with respect to the client application based on the validating.

* * * * *